April 9, 1929.  K. BAUMANN  1,708,044
LABYRINTH GLAND PACKING
Filed Sept. 8, 1924  3 Sheets-Sheet 1
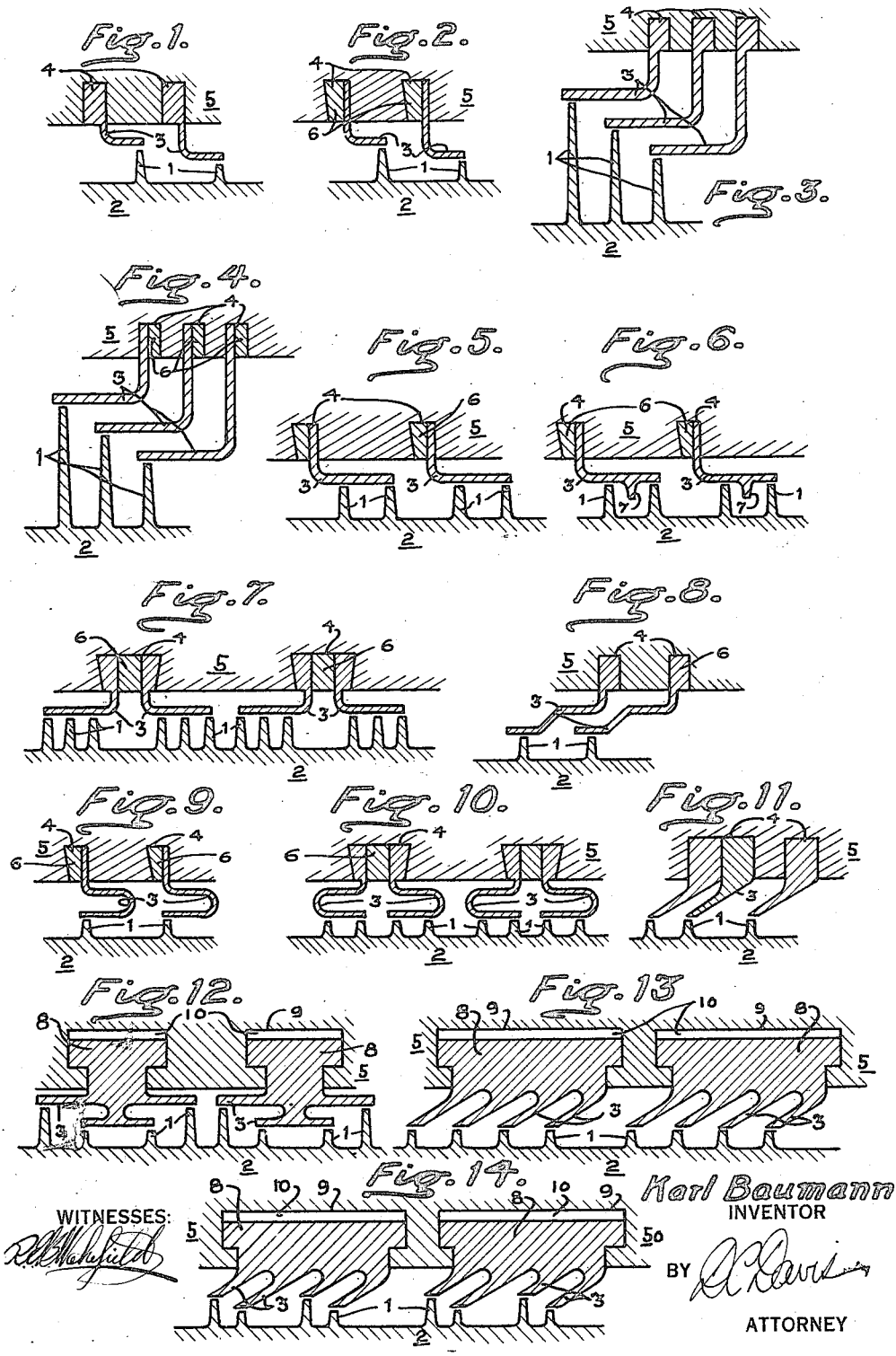

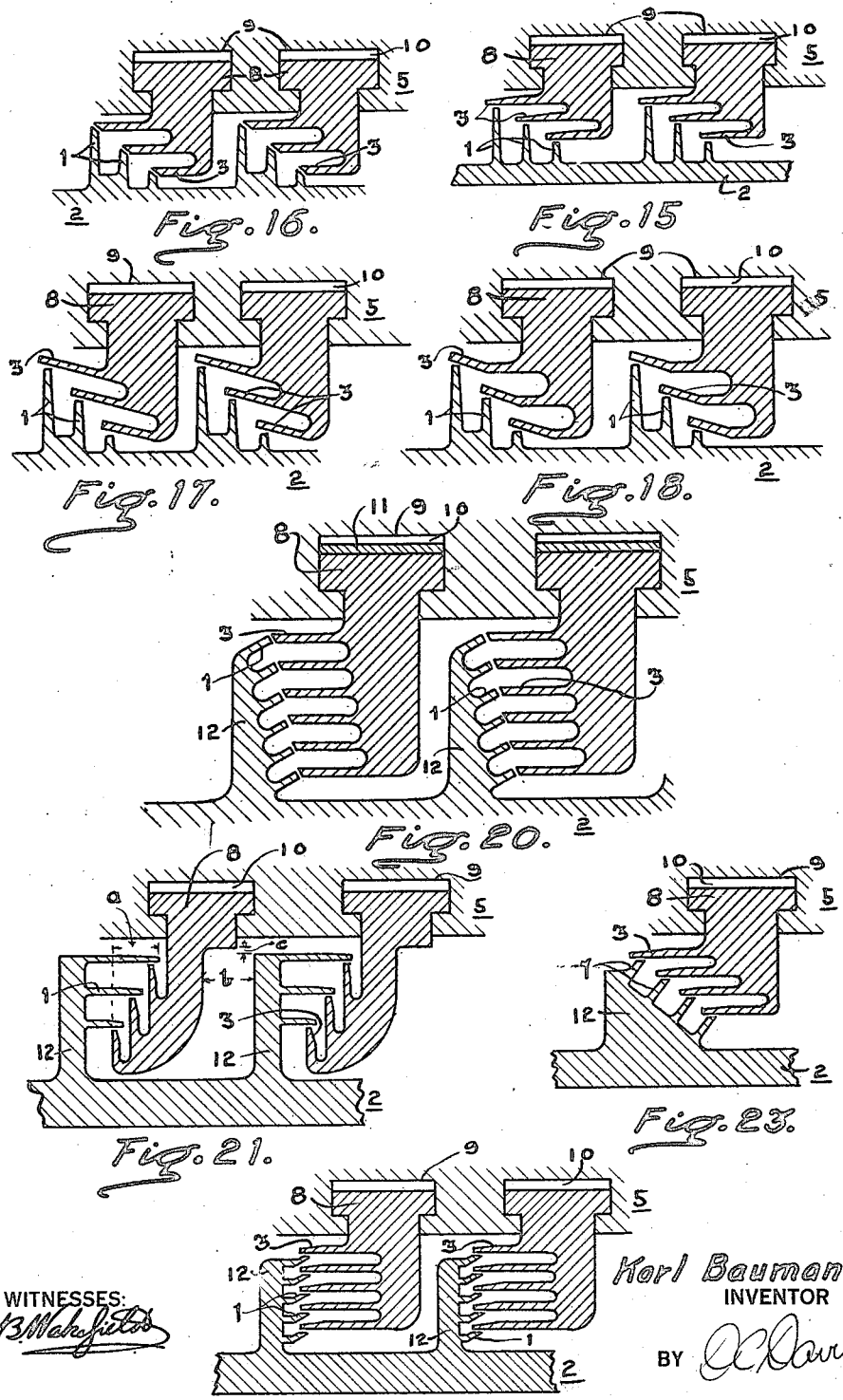

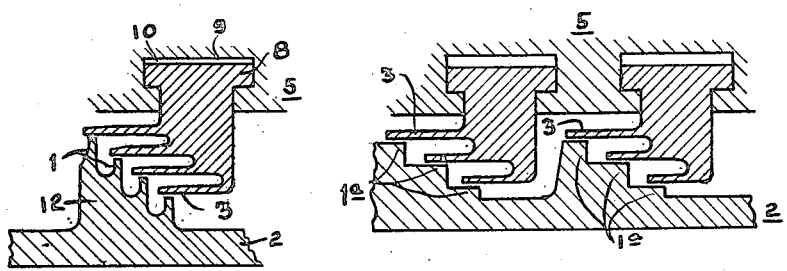
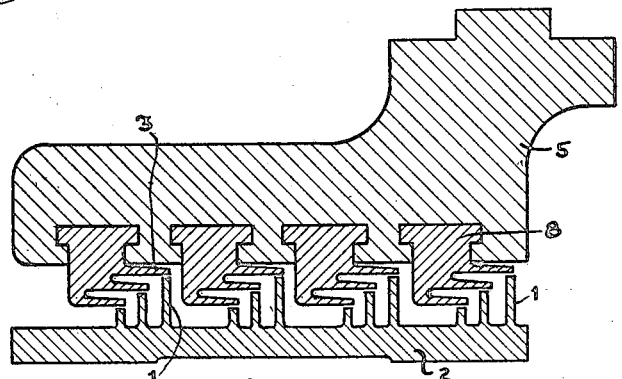
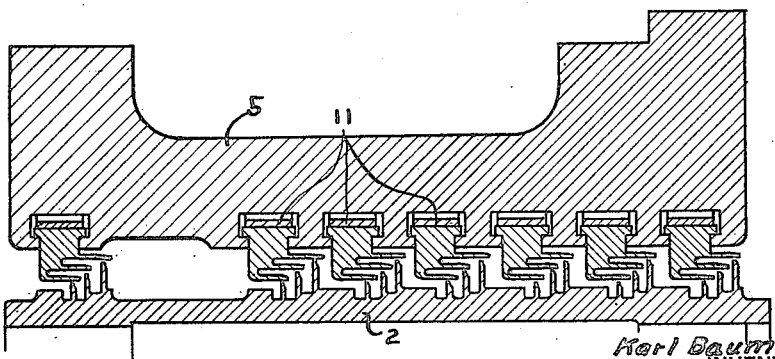

Patented Apr. 9, 1929.

1,708,044

UNITED STATES PATENT OFFICE.

KARL BAUMANN, OF URMSTON, ENGLAND, ASSIGNOR TO WESTINGHOUSE ELECTRIC & MANUFACTURING COMPANY, A CORPORATION OF PENNSYLVANIA.

LABYRINTH-GLAND PACKING.

Application filed September 8, 1924, Serial No. 736,638, and in Great Britain September 12, 1923.

This invention relates to labyrinth gland packing between a moving part and a fixed part of a machine, such as for instance between a turbine shaft and the part of the casing through which it passes.

An efficient labyrinth gland between fixed and moving parts should satisfy the following conditions:—

1. The mass near the point of contact between the parts should be small so that in case of rubbing taking place only local heating will occur.

2. The effect of deflection or distortion or expansion of the parts should be to increase the clearance so that heavy rubbing cannot occur.

3. The paths for the flow of fluid through the packing should be as tortuous as possible.

4. The clearance in the packing should decrease with an increase of pressure of the fluid the escape of which through the packing is to be prevented.

5. The axial length of the packing should be as small as possible.

In accordance with the invention a labyrinth packing gland comprises a strip secured to one of a pair of relatively movable bodies and including a part which is free to expand and contract under temperature variations, this part being so arranged that any expansion thereof increases the clearance between the same and a cooperating part of the other relatively movable body. Preferably the improved packing comprises a plurality of relatively thin and/or flexible cylindrical or annular or slightly conical strips secured to one of the relatively movable parts with the cylindrical surface of which strips the edges of projecting flanges or fins attached to the other relatively moving part are adapted to cooperate. The relative location of the cylindrical annular or slightly conical strips and the projecting flanges or fins is such that, irrespective of which of these two parts is rotating, the projecting flanges or fins are internal i. e. nearer to the center of the shaft than the cylindrical annular or slightly conical strips with which they cooperate. Consequently if rubbing takes place between the parts the cylindrical strips will, as the result of heating taking place, expand and move in a direction away from the cooperating flanges thereby automatically increasing the clearance between them and preventing hard rubbing and consequent wear. The aforementioned flanges are preferably somewhat short and stiff and are thinned at the edges which are opposite to the flexible cylindrical parts. Consequently if heating occurs at the edges the heat will be comparatively rapidly conducted away by the thicker portions to the part on which the flanges are mounted and in any case the relatively colder parts of the fins will prevent the hotter parts from expanding in a radial direction and thus from following up the expansion of the cooperating external cylindrical portions of the packing. The two parts forming the packing, namely the cylindrical portions and the flanges, may be made of the same material or the cylindrical portions may be made of a material having a higher coefficient of expansion with temperature than that of the other portions. For convenience in manufacture the cylindrical parts may be arranged to be stationary and the cooperating flanges are attached to the movable part of the machine, the shaft for example, but these positions may be reversed if desired.

In order that the invention may be more clearly understood and readily carried into practice reference will now be made to the accompanying drawings the several figures of which are longitudinal sections taken through different constructional forms of the invention.

In each of the forms illustrated by Figs. 1 to 10, the packing comprises relatively stiff, radial strips 1 formed integral with a shaft or sleeve 2 and adapted to cooperate with the inner cylindrical surfaces of strips 3 secured in annular grooves 4 in a stationary part 5.

In the forms illustrated by Figs. 1 to 7 the strips 3 are of angular cross-section and in the forms illustrated by Figs. 1 to 4 both they and the strips 1 vary in radial length. In Fig. 1 the radial portions of the strips 3 are of heavier section than the axial or cylindrical portions and are caulked directly into the grooves 4 while in Fig. 2 they are of substantially uniform section and are secured in the grooves 4 by caulking strips 6. In both Figs. 1 and 2 pairs of co-acting strips are arranged in groups of two, only one group being illustrated. The constructions illustrated by Figs. 3 and 4 differ from those illustrated by Figs. 1 and 2 respectively only in that the strips 3 are arranged with their cylindrical portions projecting in the opposite direction and the pairs of co-acting strips are arranged in groups of three. The construction illustrated by Fig. 5 differs from that illustrated by Fig. 2 in that the strips 1 are of equal radial length as are also the strips 3 and each of the latter are extended somewhat in an axial direction to cooperate with two of the former. The construction illustrated by Fig. 6 differs from that illustrated by Fig. 5 only in that short radial ribs or fins 7 are formed on the inner surfaces of the cylindrical portions of the strips 3 between the co-acting strips 1. In Fig. 7 two strips 3 are located in each groove 4 with their cylindrical portions projecting in opposite directions. Both the grooves 4 and the radial portions of the strips 3 are of dovetail section, the latter being secured in the former by caulking strips 6 and each strip 3 co-operates with three strips 1 on the shaft or sleeve 2.

The form illustrated by Fig. 8 is a modification of that illustrated by Fig. 1. Here the strips 1 are of equal length and the strips 3 are of bi-cylindro-conical formation; that is, they have two cylindrical portions of different diameters connected by a conical portion. The advantage of this form is that it provides a cylindrical portion cooperating with the strip 1, so that axial movement of the shaft will not affect the clearance. At the same time, the strips 3 may overlap even though of considerable axial extent, thereby providing a compact arrangement. Fig. 9 is a modification of Fig. 8. Here also the strips 1 are of equal length but the strips 3 are of bucket or U section and are secured in the grooves 4 by caulking strips 6. In Fig. 10 the strips 3 are of the same general formation as in Fig. 9 but two oppositely disposed strips the radial portions of which are of dovetail formation are secured in each groove 4 by a single caulking piece 6 and two strips 1 cooperate with each.

In the form illustrated by Fig. 11 strips 1 of equal length arranged in pairs cooperate with strips 3 of conical formation. These latter have radial or root portions of considerably heavier section two of which are secured by caulking in each groove 4.

In each of the forms illustrated by Figs. 12 to 24 the strips 3 are formed integral with root portions 8 which are slid into undercut grooves or recesses 9 in the stationary part 5, sufficient clearance being left at 10 for the reception of resilient packing pieces or springs 11 (illustrated in Figs. 20 and 26) if the use of these latter is desirable.

In Fig. 12 the strips 1 are formed in pairs, the members of each pair being of unequal length, and the strips 3 project axially from opposite sides of the root portions 8. In Fig. 13 the strips 1 are of equal length arranged in groups of four and the strips 3 are of conical formation. Fig. 14 differs from Fig. 13 only in that adjacent strips 1 and adjacent strips 3 are of unequal length. In Fig. 15 the strips 1 vary in length and are arranged in groups of three which cooperate with strips 3 of cylindrical formation projecting axially from the root portions 8. Fig. 16 differs from Fig. 15 in that the edges of the strips 1 are of conical shape and cooperate with similarly shaped edges of the cylindrical portions of the strips 3. This arrangement permits of adjustment of the clearances between the strips 1 and 3. Fig. 17 differs from Fig. 16 in that the strips 3 are of conical formation and the strips 1 cooperate with the conical surfaces thereof. Fig. 18 differs from Fig. 17 in that the strips 3 are of cylindro-conical formation and the strips 1 cooperate with the conical portions thereof. Fig. 19 is a modification of Fig. 15. Here the strips 1 are dispensed with and the strips 3 co-act with the cylindrical surfaces of steps or collars $1^a$ formed on the shaft or sleeve 2.

In each of the forms illustrated by Figs. 20 to 24 the whole of the strips 1 are formed on flanges or collars 12 on the shaft or sleeve 2. In Fig. 20 they are of conical formation and co-act with the edges of the strips 3 which are of cylindrical formation and project axially from the root portions 8. In Fig. 21 the strips 1, which are of cylindrical formation, project axially from the flanges or collars 12 and co-act with the tips of the strips 3 which project radially from the root portions 8. In this particular construction the external or stationary part 5 has to be capable of axial movement greater than $a$ in the direction indicated by the arrow to permit of the gland being dismantled. Consequently, an axial clearance $b$ greater than $a$ and a radial clearance $c$ are provided.

In the form illustrated by Fig. 22 the strips 1 are of cylindro-conical formation and the tips of the conical portions thereof co-act with the strips 3 which are of cylindrical formation and project axially from the root portions 8. In the form illustrated by Fig. 23 both the strips 1 and one face of each flange or collar 12 are of conical formation. The tips of the strips 1 co-act with the cylindrical surfaces of the strips 3 which project axially from the root portions 8. In Fig. 24 the strips 1 are of equal length and their edges cooperate with the inner cylindrical surfaces of the strips 3 which project axially from the root portion 8.

Fig. 25 is a longitudinal section illustrating the assembly of a complete gland the construction of which is substantially similar to that described with reference to Fig. 15.

Fig. 26 is a longitudinal section illustrating a different assembly of a complete gland. The construction here illustrated is also substantially similar to that illustrated by Fig. 15 except that the sleeve 2 is of stepped formation and the spring packing pieces 11 are illustrated in position.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. The combination with relatively rotatable members, of means for packing the clearance between said members comprising packing elements extending radially outwardly from one of said members, other packing elements having axially-extending portions and radially-extending root portions, said axially-extending portions encompassing the first mentioned packing elements and packing against the outer periphery thereof, and means providing for the attachment of said root portions to the other of said relatively rotatable members, whereby, in case of heating due to accidental rubbing of the packing elements, said axially-extending portions are free to expand and move radially outward, thereby increasing the clearance between the packing elements and preventing injury thereto.

2. In a labyrinth packing gland, the combination of a pair of relatively movable bodies so disposed as to provide a fluid passage therebetween, a packing element extending from one of the relatively movable bodies and having a portion substantially parallel to the direction of the fluid flow comprising a cylindrical section, a conical section joining said cylindrical section, and a second cylindrical section joining the conical section, a second packing element extending from the other movable body in a plane normal to the fluid flow and cooperating with a cylindrical portion of the first mentioned packing element to minimize fluid leakage.

3. In a labyrinth packing gland, the combination of a pair of relatively movable bodies so disposed as to provide a fluid passage therebetween, a packing element extending from one of the relatively movable bodies and having a portion substantially parallel to the direction of the fluid flow and comprising a conical portion and a free edge cylindrical portion at the inner edge of the conical portion, a second packing element extending from the other movable body in a plane normal to the fluid flow and cooperating with the cylindrical portion of the first mentioned packing element to minimize fluid leakage.

4. In a packing for a pair of relatively rotatable members, the combination of a plurality of packing elements of angle section formed separately from said members and each having a radial portion attached to one of the members and an axially-extending portion, and a plurality of radially extending packing elements carried by the other member and having their peripheries encompassed by said axially-extending portions, whereby, in case of heating due to accidental rubbing of the packing elements, said axially-extending portions are free to expand and move radially outward, thereby increasing the clearance between the packing elements and preventing injury thereto.

5. A packing for the clearance between two relatively rotatable members including a packing strip carried by one member and having an axially extending portion, the other member having a packing part cooperating with the axially extending portion and encompassed thereby, and the packing strip having a higher coefficient of expansion than the packing part encompassed thereby, whereby, in case of heating due to accidental rubbing, the packing strip expands more than the packing part, thereby increasing the clearance therebetween.

6. In a packing for a pair of relatively rotatable members, the combination of a packing strip carried by one of said members and a second packing strip carried by the other of said members, the second strip having an axially extending free edge portion encompassing the first strip and having a higher coefficient of expansion than the first strip, whereby, in case of heating due to accidental rubbing, the second strip expands more than the first strip, thereby increasing the clearance therebetween.

In testimony whereof, I have hereunto subscribed my name this 8th day of August, 1924.

KARL BAUMANN.